United States Patent [19]
Murphy et al.

[11] Patent Number: 5,709,059
[45] Date of Patent: Jan. 20, 1998

[54] FASTENER FOR CEMENTITIOUS SUBSTRATE

[75] Inventors: Colin Murphy; Robert Mills, both of Seattle; Mark Reichlin, Marysville; Steven Bunn; Charles Phillips, both of Seattle, all of Wash.

[73] Assignee: Exterior Research & Design, LLC, Seattle, Wash.

[21] Appl. No.: 627,029

[22] Filed: Apr. 3, 1996

[51] Int. Cl.⁶ .................................................. F16B 15/00
[52] U.S. Cl. ...................... 52/410; 52/698; 411/461; 411/469; 411/480
[58] Field of Search .................. 52/408, 410, 745.21, 52/698; 411/469, 457, 461, 480; 248/679, 500

[56] References Cited

U.S. PATENT DOCUMENTS

| | | |
|---|---|---|
| 2,919,621 | 1/1960 | Langdon . |
| 3,466,967 | 9/1969 | Hallock . |
| 3,710,672 | 1/1973 | Hallock . |
| 4,031,802 | 6/1977 | Hallock . |
| 4,476,660 | 10/1984 | Francovitch . |
| 4,574,551 | 3/1986 | Giannuzzi . |
| 4,611,964 | 9/1986 | Schlein . |
| 4,627,207 | 12/1986 | Young et al. . |
| 4,736,560 | 4/1988 | Murphy . |
| 4,763,456 | 8/1988 | Giannuzzi . |
| 4,795,294 | 1/1989 | Takada et al. ............ 411/469 X |
| 4,945,699 | 8/1990 | Murphy . |
| 5,102,275 | 4/1992 | Hulsey ............................ 411/134 |
| 5,217,317 | 6/1993 | Young . |
| 5,267,423 | 12/1993 | Giannuzzi ......................... 52/410 |
| 5,509,769 | 4/1996 | Larson et al. ............... 411/480 X |

FOREIGN PATENT DOCUMENTS

| | | |
|---|---|---|
| 307647 A1 | 3/1989 | European Pat. Off. . |
| 2072783 | 10/1981 | United Kingdom . |

Primary Examiner—Wynn E. Wood
Assistant Examiner—Timothy B. Kang
Attorney, Agent, or Firm—William Squire

[57] ABSTRACT

A circular thin metal or thermoplastic disc stress plate has an annular stiffening rim and groove and a central opening. Three equilateral and symmetrically oriented elongated nail-like members depend from the plate at the rib and groove inclined in diverging relation relative to a vertical axis normal to and central the plate on a conical surface of revolution. The members extend radially beyond the perimeter of the stress plate projected onto the members forming an annular attachment region to a cementitious substrate significantly greater than the area subtended by the stress plate. Two or more than three members may be used in the alternative. The nail-like members have conical tips which may be any shape and blunt. The members preferably are circular cylinder steel, may be other transverse sectional shapes, and are driven individually or simultaneously into the substrate either through holes in the plate or penetrate the plate material by a power operated nail driving tool. The members may have heads of different shapes which are substantially recessed against the rib in the groove.

24 Claims, 2 Drawing Sheets

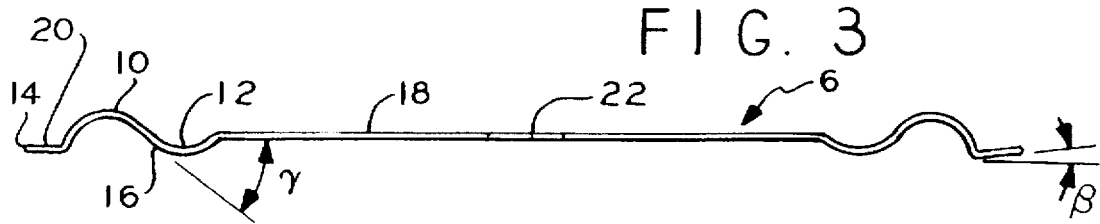
FIG. 3
FIG. 3a FIG. 3b FIG. 3c FIG. 3d
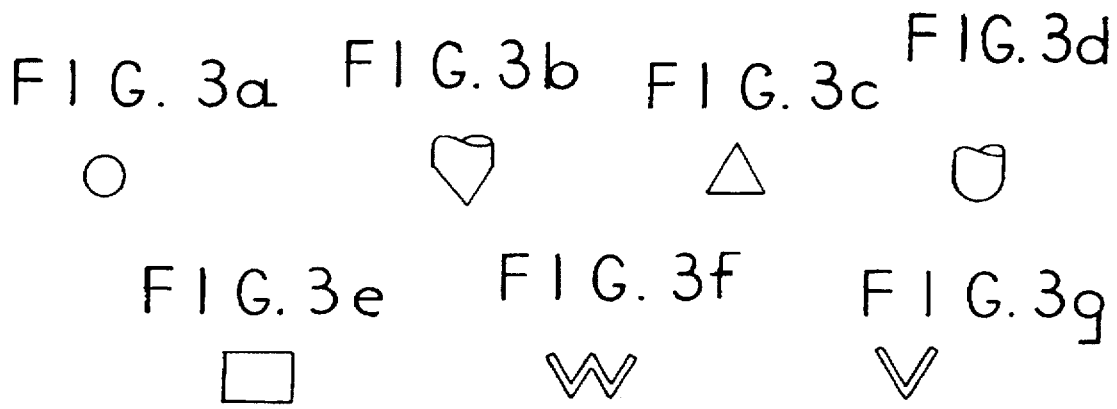
FIG. 3e FIG. 3f FIG. 3g
FIG. 4
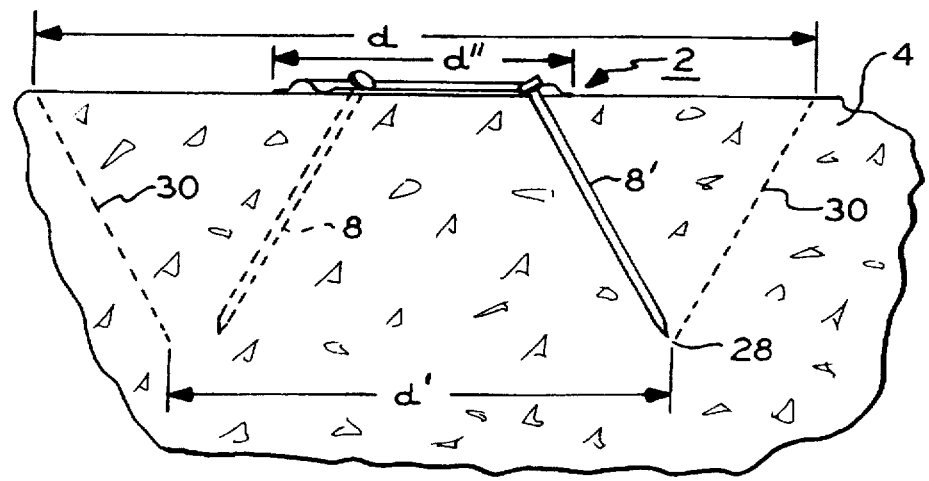
FIG. 5
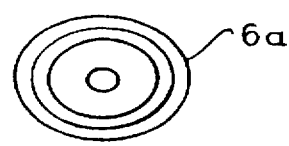
FIG. 6
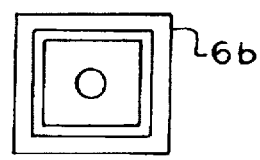

FASTENER FOR CEMENTITIOUS SUBSTRATE

This invention relates to fasteners for attaching roofing materials to a cementitious roof substrate.

Roof fasteners are in wide use and are used to attach roofing materials such as insulation or the like to a cementitious substrate or deck, e.g., concrete with or without an aggregate or cementitious wood fiber. So called base ply fasteners were developed for insertion into aggregate based lightweight concrete. The fastener, made of galvanized steel, is driven into the substrate with a hammer or so called "nail stick", a long handled device having a weighted magnet attached to a base to hold the fastener in place while the fastener is driven home with a single stroke. The impact on the fastener head causes the fastener's legs to expand during driving. A galvanized coating adds to the withdrawal resistance of the fastener. If the concrete density exceeds the fastener's leg's compressive strength, the fastener may fail to open or crumple.

Existing plates are fabricated from rigid material with reinforcing rings or embossments to provide additional strength. The reinforcing rings provide uplift resistance when the substrate insulation, base ply or membrane is lifted vertically from positive and/or negative pressure. The rings are needed due to the central attachment point of the fastener.

So called Hallock fasteners are described in U.S. Pat. Nos. 3,710,672, 4,031,802 and 3,466,967. These describe hollow sheet metal and tapered sheet metal nails useful for roofing applications as described above. The fasteners have what is called a stress plate and a projecting nail portion or shank which depends centrally relative to the stress plate. The tapered nail portion shank expands radially when driven into the substrate as shown in U.S. Pat. No. 3,466,967 and increases withdrawal resistance.

An improved fastener is described in U.S. Pat. No. 4,627,207 to Young et al. The stress plate diameter is increased over the prior fasteners and a center hole is enlarged for fastener insertion. The stress plate is embossed with holes to facilitate the flow of asphalt around the stress plate and base sheet to increase the rupture resistance.

These fasteners were developed to secure a fiberglass or organic base sheet to the substrate over which multiple plies of bitumen impregnated felt and asphalt or coal tar pitch are applied. The fastener holds a relatively fragile base sheet in place while additional plies and bitumen are applied to increase the weight and rigidity of the roof system.

More recent concrete deck systems incorporate air creating cellular structures which have reduced thicknesses and utilize shorter fasteners (e.g., 1.2 inches). These fasteners also provide increased compressive strength. However, these latter deck systems harden over time making reroofing difficult as the material becomes more brittle as it ages. The hammer blows required for installation and insertion of the fasteners tend to breakup lightweight concrete. In addition, using hammer-in fasteners in high density substrates creates inconsistent results. The fastener's legs may bend, not open correctly, or the lightweight material can crumble outside the fastener's legs, significantly reducing the fastener's withdrawal resistance.

Base ply fasteners historically exhibit highly variable withdrawal resistances. This is due to variations in the deck material and differing application procedures. The variability of cellular lightweight concrete is greater than that of aggregate based lightweight concrete. This variability increases the difficulty in testing roof assemblies for wind uplift resistance as low withdrawal resistance of a few fasteners can lead to a sample roof premature failure.

Over recent years, the number of roof system types has increased and tend to be lighter using single ply systems with little or no surface aggregate. These lighter systems are subject to greater wind uplift pressures creating greater reliance on the mechanical attachment of the material to the roof deck.

The present inventors recognize that the lighter systems have changed the movement of the membrane attached to the deck by the fasteners and thus the loading characteristics on the fasteners. Built up roof assemblies are heavy and rigid, so that the fastener loading is primarily vertical. The present inventors recognize that the lighter roof assemblies tend to move in wave motions, creating oblique loads on the fastener. This in turn creates a tearing condition at the stress plate edges. U.S. Pat. No. 4,627,207 provides an increased bearing surface and asphalt interface which tends to strengthen the membrane's connection to the substrate.

However, other roof systems do not use asphalt or coal tar as an adhesive and waterproofing material. Some newer membranes are applied by torch melting the underside to tack the membrane in place.

The Hallock fastener size typically requires a relatively large hole in the base sheet, creating a weakness in the base sheet that is easily torn in the presence of an uplift pressure. The U.S. Pat. No. 4,627,207 attempts to address this problem by permitting asphalt to enter under and around the stress plate.

Recently, round and square stress plates have been used with threaded fasteners or other fasteners for attachment to denser substrates such as steel, wood and concrete. The stress plates are secured through the center and are relatively flat. See for example, U.S. Pat. Nos. 4,574,551 and 4,763,456 to Giannuzzi. These perform well with 24–26 gauge steel without the need for asphalt to surround the stress plate to provide additional support.

Later advances include securing thermoset or thermoplastic materials with threaded shanks to penetrate the substrate. These fasteners are sensitive to substrate type and require different types and sizes of pilot holes to increase performance. Installation time is increased as a depth sensor is used to control torque to reduce possible strip out of the fastener. In addition, high density substrates may strip or damage the fastener's threads or point.

Other fasteners incorporate steel prongs which are pushed through the fasteners central shank and form fish hooks increasing fastener withdrawal resistance. This fastener requires a special installation tool. The central installation creates a weakness in the fastener's withdrawal resistance when subjected to oblique loads. The fish hooks proximity to each other can break up the substrate creating reduced withdrawal resistance. Also, the fish hooks create stress fractures within the substrate that also reduces withdrawal resistance in the presence of a dynamic load.

Certain nails of the prior art employ a nail that fits within a central void of a tube. This structure limits the diameter of the nail to a relatively small value that will fit in the central void of the tube. The size and hardness limitation of the nail limits its performance as a fastener.

The present inventors recognize a need for a roofing fastener that will provide increased withdrawal resistance to lightweight cementitious substrates in response to oblique loads and that provides consistent fastening strength regardless the substrate parameters associated therewith.

A fastener for attachment to a substrate material according to the present invention comprises a stress plate having a thickness and opposing broad surfaces and a plurality of discrete elongated members each defining a longitudinal axis and having proximal and distal ends. The distal ends penetrate into the substrate material. The members are secured to and depend from the stress plate at the proximal ends and diverge away from one another in a direction away from the stress plate, preferably in a conical surface of revolution. The members also are preferably symmetrically oriented relative to a central vertical axis.

In one embodiment, the stress plate opposing broad surfaces have at least one perimeter which subtends a first area, the members projecting juxtaposed with a region that extends beyond the at least one perimeter.

In a further embodiment, the members are inclined relative to the stress plate broad surfaces at an angle less than 90°.

In a further embodiment, the stress plate has an annular flange extending radially outwardly, the flange being juxtaposed with the members and being flared radially outwardly and upwardly in a direction away from the juxtaposed members.

In a still further embodiment, the stress plate defines a central axis normal to the stress plate, the fastener including at least three of the members spaced substantially equilateral with their longitudinal axes intersecting substantially on the central axis.

IN THE DRAWING

FIG. 1 is a plan view of a fastener installed in a substrate according to an embodiment of the present invention;

FIGS. 1a, 1b, and 1c are plan views of different head arrangements for use with the fastener of the present invention;

FIG. 3 is a sectional view through the stress plate of FIG. 1 taken along lines 3—3;

Figure 1:
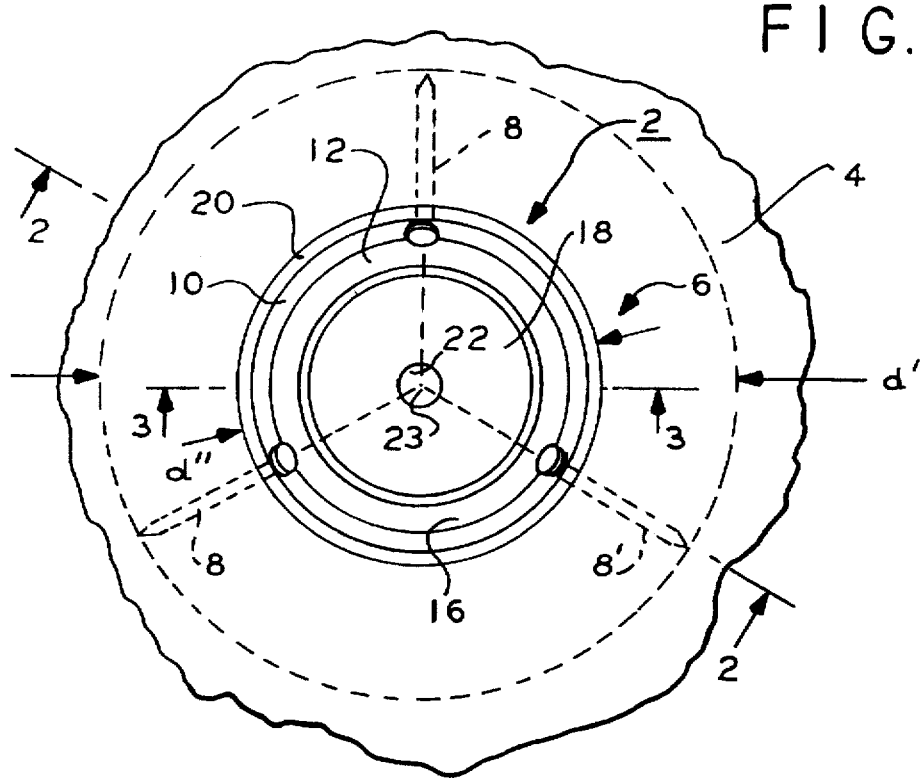
Figure 2:
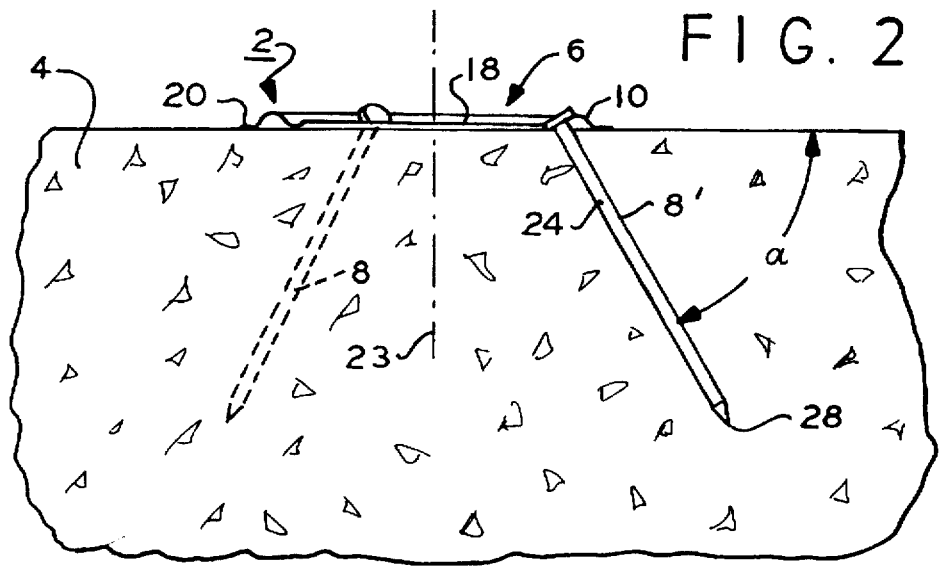
FIG. 2 is a sectional side elevation view of the fastener of FIG. 1 taken along lines 2—2.

FIGS. 3a, 3b, 3c, 3d and 3e are various shapes of the tips of the penetrating members of the embodiment of the present invention, FIGS. 3a, 3c and 3e being plan views and FIGS. 3b and 3d being fragmented side elevation views;

FIGS. 3f and 3g are transverse sectional views of alternate embodiments of the penetrating members of FIG. 1;

FIG. 4 is a sectional side elevation view similar to the view of FIG. 2 for illustrating certain principles of the present invention; and FIGS. 5 and 6 are plan views of different stress plates according to further embodiments of the present invention.

In FIG. 1, fastener 2 is attached to a substrate 4, e.g., a cementitious roofing material such as lightweight concrete or cementitious wood fiber roof deck. The substrate 4 may also comprise a surface layer or membrane material (not shown) which is to be attached to a cementitious substrate such as substrate 4.

Device 2 comprises a stress plate 6 and an annular array of deck substrate penetrating prong members 8, 8'. The plate 6, FIG. 3, preferably is a circular disc, but may be other shapes as shown for example in FIGS. 5 and 6. The plate 6 is generally planar with opposing broad surfaces and includes an annular upstanding reinforcing rib 10 and an adjacent reinforcing annular channel 12. The rib 10 is radially outwardly of the channel 12 which are adjacent to the plate 6 peripheral edge 14. The plate 6 is of uniform thickness and may be about 0.019–0.029 inches (0.5–0.8 mm) thick stamped steel with a galvanized zinc coating. The plate may also be molded or fabricated thermoplastic material, e.g., polyethylene, polypropolene, polycarbonate, or nylon, of preferably about 0.019–0.187 inches (0.5–5 mm) thickness. The plate planar central region 18 forms opposing broad surfaces. In the alternative, the plate 6 may be stainless steel or other materials. The rib 10 and channel 12 are formed with continuous curves forming a generally S-shape in section.

The rib 10, FIG. 3, has a side wall 16 which is at an angle γ, preferably about 30°, with the plane of the plate 6 central region 18. This side wall 16 extends into the channel 12 and forms a side of the channel as well. Wall 16 forms complementary angle α, FIG. 2, of inclination of the members 8, 8' depending therefrom. Angle α thus is preferably about 60° with the plane of the plate 6 central region 18. Wall 16 may have an aperture (not shown) for receiving each of the members 8.

Radially outwardly of the rib 10 is a circular flange 20. Flange 20 is tilted upwardly slight at an angle B, for example about 5°–10°. This upward tilt minimizes the potential of the flange 20 cutting into the roofing material substrate 4 during installation. The plate 6 has a central circular opening 22 and defines a vertical axis 23, FIG. 2.

There are three elongated preferably identical prong members 8, 8' FIG. 2. Representative prong member 8' will be described. Member 8' comprises a circular cylindrical shank 24 and a head 26. The member 8' is preferably about 1 to 3 inches (2.5–7.5 cm) in length and 0.092 to 0.175 inches (2–4.5 mm) in diameter when a circular cylinder according to a given implementation and including a head 26. The member 8' preferably has a pointed conical tip 28. The head 26 is preferably a circular cylindrical disc but may have other shapes. For example, FIGS. 1a, 1b and 1c illustrate different head shapes.

Figure 1A:
Figure 1B:
Figure 1C:

In FIG. 1a the head 26a is half moon shaped, i.e., semicircular in plan view. In FIG. 1b head 26b is rectangular in plan view and in FIG. 1c the head 26c is oval. Still other head shapes may also be used. Member 8' is preferably steel and about 0.045 to 0.18 inches diameter, but may also be thermoplastic or other materials. The head 26 is preferably integral and one piece with the shank 24. If of plastic material, the head and shank are molded as one unit or formed as one unit if steel. In the alternative, the head may be omitted in certain implementations by attaching the shank directly to the plate 6 by welding, bonding and so on as appropriate for a given implementation, or not attached directly to the plate 6. Further, the members 8, 8' need not be attached to the plate to form a unitary fastener therewith as a separate assembly, but may be attached to the plate during installation of the fastener to a substrate as desired according to a given implementation.

As shown in FIG. 2, the head abuts the wall 16 (FIG. 3) so that the shank extends at angle α. Each shank of the members 8, 8' are all preferably at angle α as determined by the angle γ of wall 16 of rib 10. The angle α while preferably 60° may be other values, e.g., 20°–75° in accordance with a given implementation.

The length of the shank is important. In FIG. 4, the shanks 24 are arranged in a conical array. The tips 28 lie on a circle of diameter d'. The plate 6 has a diameter of d". It can be shown that the withdrawal resistance of the fastener is defined by diameter d determined by the withdrawal stress region formed by fastener withdrawal stress lines 30 in the substrate. In concrete or cementitious materials, anchors are supported by a core of concrete or other substrate material which is measured by a multiple of the fastener diameter, d'.

Depending upon the anchoring point strength, the mode of failure of the substrate and fastener can be bending of the attachment points, withdrawal of the attachment points or breakage of a large core of the substrate material. The modes of failure differ for various lightweight concrete formulations as their compressive strength can differ from 100 psi to 600 psi. The fastener 2 can accommodate an even wider range of compressive strength. The higher density materials and fragile cellular materials fail by core breakage. The fastener 2 withdrawal resistance can be increased by increasing the attachment diameter d', FIG. 4, by changing the value of the angle α, and/or by using a flatter attachment shank as illustrated in FIGS. 3f and 3g and/or by increasing the diameter d' by increasing the shank lengths.

The fastener offers an increased variety of rupture values of the substrate corresponding to withdrawal resistance values as determined by industry standard FM 1-48 Loss Prevention Data Sheet. The prior art fasteners are limited in versatility in this respect, especially the Hallock fastener and nail type fasteners as described in the introductory portion.

Because of the relatively wide area of withdrawal resistance diameter d, FIG. 4, the present invention provides a significant advance in the art of base sheet attachment to lightweight concrete. The fastener 2 provides increased uplift resistance and greater consistency at each attachment point in a variety of base sheets. The three point attachment wherein the members 8, 8' lie on a conical surface of revolution described herein reduces fracturing of the lightweight concrete normally occurring with single point attachment devices in the stress plate center, thereby increasing withdrawal resistance.

The three point attachment near the stress plate 6 edge 14 minimizes oblique loading ability to withdraw the fastener by lever action. Should a single shank prong member 8 fail, two other attachment shank prong members remain to hold the fastener to the substrate. Complete fastener withdrawal requires failure of all three attachment points. This reduces the problems associated with the other attachment arrangements as described in the introductory portion.

The fastening point shanks can be changed in length to accommodate existing roofs or new insulation. The fastener 2 performs well in both low and high density substrates, and application into low and high density substrates are equally applicable. The attachment points of the shank probe members are provided a hardness and diameter d' to increase strength for application in higher density substrates.

Due to increased withdrawal resistance, a greater number of different roof configurations can be installed into lightweight concrete with fastener 2. It can be shown that withdrawal resistance of a fastener 2 in new and aged aggregate and cellular lightweight substrates are consistently 30–50% greater in new cellular and 30–70% greater in aged cellular substrates than prior art fasteners.

The present invention fastener 2 members 8, 8' need not be as hard as prior art fasteners because of the multiple attachment points near the stress plate perimeter. The attachment points limit base material damage because of the relatively small holes generated. The heads when attached to the stress plate 6 are flush or protrude a minor amount above the rib 10. In the alternative, the plate 6 could be fabricated with barbs (not shown) to increase base sheet attachment strength.

The fastener 2 thus reduces the need for a large number of fasteners by way of increased withdrawal resistance and decreased damage to the substrate. Insulation of 1.5 inches thick can be attached to roofing substrates with the fastener 2.

Many newer roofing systems do not use asphalt and thus there is no asphalt to flow around and into the plate 6. The plate 6 is made as flat as possible to provide a good bonding surface to the substrate and yet its outer edge will not cut the base sheet due to its upward flaring. The plate 6 is made thin and yet is rigid due to multiple attachment points at the plate 6 perimeter. The thin plate 6 creates flexibility at the outer edge 14 that will flex when uplift pressure is applied. The flat surface provides a good bonding surface for adhesives to bond the plate 6 to the substrate 4. The plate surface may be further processed with coatings or finishes to improve bonding to the substrate.

The device 2 fastener constructed according to the present invention can use a thin stress plate with little or no reinforcement. The three members 8, 8' are located spaced from the center providing an expansive area of securement as shown by diameter d, FIG. 4. The flexibility of the stress plate 6 assists in minimizing rupture thereof. The plate 6 diameter and thickness are set to those values according to a given attachment implementation.

The members 8 preferably are made from wire in a cold header or nail machine and coated with a relatively thick molten galvanizing layer. The coating provides a chemical bond with lightweight concrete.

In FIGS. 3a–3e, various shank prong member tips are shown which may used according to a given implementation. FIG. 3a shows a flat circular tip used on a cylindrical shank. FIG. 3b illustrates a conical tapered pointed tip. FIG. 3c shows a shank that is triangular in transverse section with a flat tip. FIG. 3d shows a semi-spherical tip for a cylindrical shank. FIG. 3e shows a rectangular or square shank in transverse section with a flat tip. FIGS. 3f and 3g show a W-shaped shank 8 and a V-shaped shank for a member 8, comprising flat stock material, respectively. FIG. 5 shows an oval stress plate 6a and FIG. 6 shows a square plate 6b.

The device 2 can employ attachment members such as members 8, 8' of any thickness and with any plating or coating. Minimum deformation or abrasion occurs during installation to damage the corrosion resistance of the coating.

The device 2 penetrates a deck with a single blow, reducing chance for deck breakage. The entry of each of the members 8, 8' into the deck while at angle α, is linear, further minimizing the occurrence of deck damage during insertion.

The fastener of the present invention may be used with lightweight concrete that is cellular, aggregate or new hybrid types, oriented strand board, plywood, plastic, low density structural concrete and cementitious wood fiber such as rectum and gypsum. The length of the shanks 8 are set to accommodate various different materials above the substrate deck and the deck thickness.

The shanks can be installed through preformed holes in the stress plate or directly through the stress plate material. The members 8 can be penetrated through the plate 6 with an air power or spring powered nailer apparatus. The members 8 may be installed simultaneously or one at a time. The plate 6 central opening 22 may be used for alignment of a single or multiple nailer.

The central opening 22 also allows asphalt to flow into and under the plate 6. The fastener shank probe members 8 may be installed singly or in ganged fashion with a gang nailer. Using a gang nailer, three small air pistons simultaneously set the members 8. A gang nailer has an alignment hole and multiple pistons fixed at a preestablished angle and compression point.

A single nailer may be used with a shoe attachment aligning the nailer in the plate 6 center opening 22. This will insure the shank probe members 8 are inserted equidistant and symmetrical relative to each other. Manual insertion of the fastener is not recommended to preclude inconsistent installation.

An alternate method for securing the plate with the members 8, 8' to a deck is to attach a shoe (not shown) to an insertion tool (not shown). The shoe is wedged shaped, e.g., conical or pyramid shaped, with an inclined side wall. The wall may have a channel for each member 8 to guide the member during insertion. The nail is discharged from the tool perpendicular to the plane of the plate 6 region 18 and then strikes the inclined side wall of the shoe which deflects the prong member 8 at the desired angle α. This causes the members 8, 8' to pierce the plate 6 and seat in the channel 12 of the plate 6.

A light gauge steel deck may be used as a casting pan for the lightweight concrete pour. A powered gun installs the anchoring shanks through the steel deck to provide additional securement.

In edge attachment, two or three attachment points (shanks 8) are positioned for optimum performance. By positioning two of the attachment points of the shanks of members 8, 8' aligned somewhat perpendicular to a seam increased resistance to oblique loads is provided.

It will occur to one of ordinary skill that various modifications may be made to the disclosed embodiments without departing from the scope and spirit of the present invention. The description herein is given by way of illustration and not limitation. It is intended that the scope of the invention is as defined in the appended claims.

What is claimed is:

1. A fastener for attaching and holding a membrane to a cementitious roof deck substrate material comprising:
    a stress plate having an annular periphery subtending a given area and including an outer peripheral annular region, a thickness and opposing broad surfaces for attaching said membrane to the roof deck; and
    a plurality of discrete elongated shank members each having a length of a given extent defining a longitudinal axis and having proximal and distal ends, said distal ends for penetration into said substrate material, said members being secured to and depending from the stress plate at said proximal ends in said annular peripheral region, said members diverging away from one another for their entire given extent in a direction away from the stress plate annular periphery so that a major portion of each said shank members extends beyond the subtended given area beyond said stress plate annular periphery.

2. The fastener of claim 1 wherein said stress plate has at least one transverse dimension defining opposing broad surfaces having a perimeter defined by said annular periphery and is substantially thin as compared to said transverse dimension, said plate having an annular rib adjacent to said perimeter having a surface inclined relative to said broad surfaces, said members passing through said rib at about right angles to said rib surface, said members each having a head with a planar surface abutting said surface.

3. The fastener of claim 2 wherein said members are inclined at an angle relative to said stress plate broad surfaces approximately 50° to 70°.

4. The fastener of claim 1 wherein the members are linear and lie on a conical surface of revolution.

5. The fastener of claim 1 wherein the members are cylindrical for a major portion of their length.

6. The fastener of claim 5 wherein the distal ends each comprise a narrowed tip.

7. The fastener of claim 1 including an enlarged head secured to each said member proximal end.

8. The fastener of claim 1 wherein the stress plate and members are steel with a galvanized coating.

9. The fastener of claim 1 wherein the stress plate is substantially a circular disc having a thickness that is substantially smaller than the diameter of said disc.

10. The fastener of claim 9 wherein the stress plate has at least one annular rib having a side wall defining a plane, said members passing normal to and through said side wall and said plane.

11. The fastener of claim 9 wherein the stress plate has a central opening.

12. The fastener of claim 1 wherein the stress plate has an annular flange extending radially outwardly, said flange being juxtaposed with said members and being flared radially outwardly and upwardly in a direction away from said juxtaposed members.

13. The fastener of claim 1 wherein the stress plate defines a central axis normal to the stress plate, said fastener including at least three of said members spaced substantially equilateral with their longitudinal axes intersecting substantially at said central axis.

14. The fastener of claim 1 wherein the distal end of the members are blunt.

15. The fastener of claim 1 wherein the stress plate is square.

16. The fastener of claim 1 wherein the stress plate is a circular disc.

17. The fastener of claim 1 wherein the stress plate is oval.

18. The fastener of claim 1 wherein the stress plate has a periphery and includes at least one rib upstanding a given distance from the stress plate adjacent to the periphery in a direction away from said distal ends and located adjacent to the periphery, said member proximal ends each penetrating the at least one rib and projecting upwardly away from said stress plate a distance approximately said given distance.

19. The fastener of claim 1 wherein the members each have a substantially uniform transverse sectional shape.

20. The fastener of claim 1 wherein the stress plate thickness is relatively small as compared to its transverse dimension.

21. The fastener of claim 1 wherein the stress plate is selected from the group consisting of plastic and metal.

22. A fastener for attachment to a cementitious substrate roof material comprising:
    a stress plate disc having a thickness and opposing broad surfaces and a central opening, said stress plate having an outer periphery subtending a region of a first area;
    a rib upstanding from the plate adjacent to the plate outer periphery;
    at least two discrete elongated members each having a length and defining a longitudinal axis and having proximal and distal ends, said distal ends for penetration into said substrate material, said members being secured to and depending from the stress plate at said proximal ends, said members diverging away from one another for their entire length in a direction away from the stress plate and subtending at said distal ends a diametrical region of a second area greater than the first area so that a major portion of each said elongated members extends beyond the stress plate subtended outer periphery.

23. The fastener of claim 22 wherein the disc has a diametrical dimension, the members having a length and are arranged in an annular array such that the distal ends of said members define a diametrical dimension of approximately double the disc diametrical dimension.

24. The fastener of claim 22 wherein the members are linear between said ends and lie on a conical surface of revolution.

* * * * *